Feb. 14, 1939.　　C. O. MARSHALL　　2,147,304
COMPUTING DEVICE
Filed Oct. 16, 1936　　2 Sheets—Sheet 1
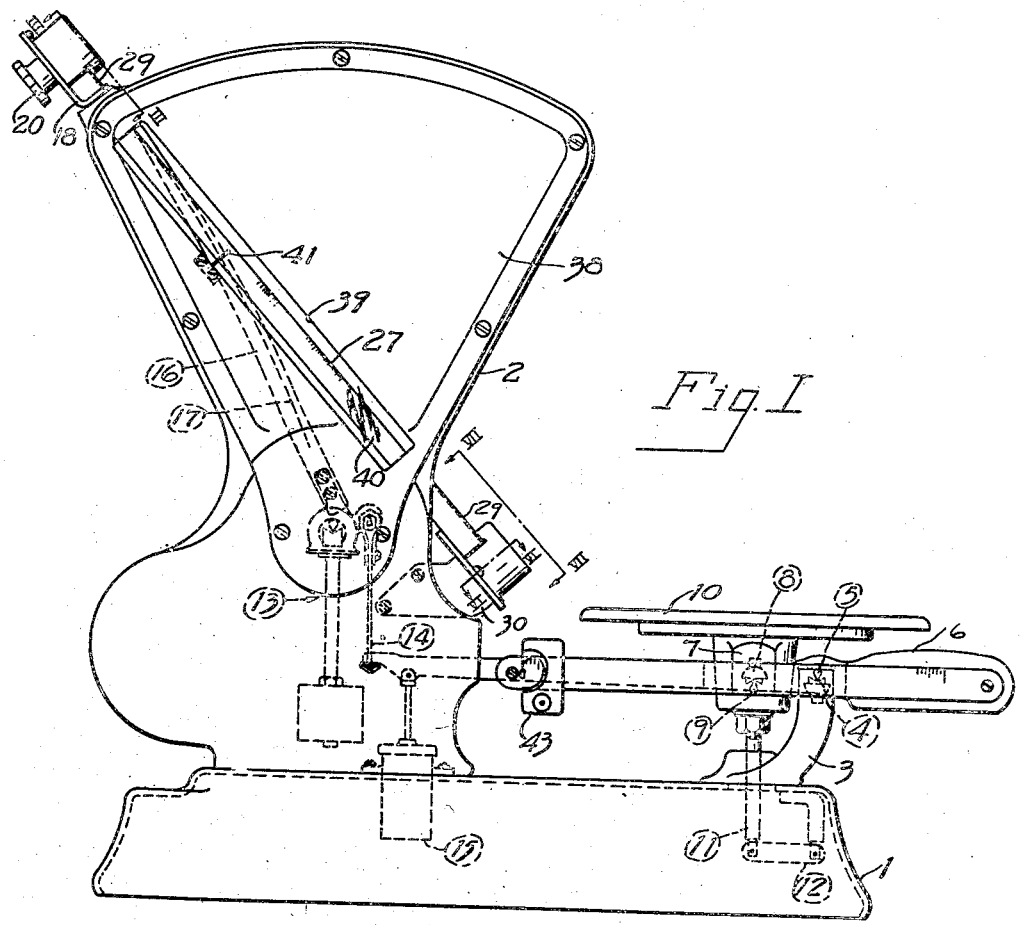
INVENTOR
Charles O. Marshall

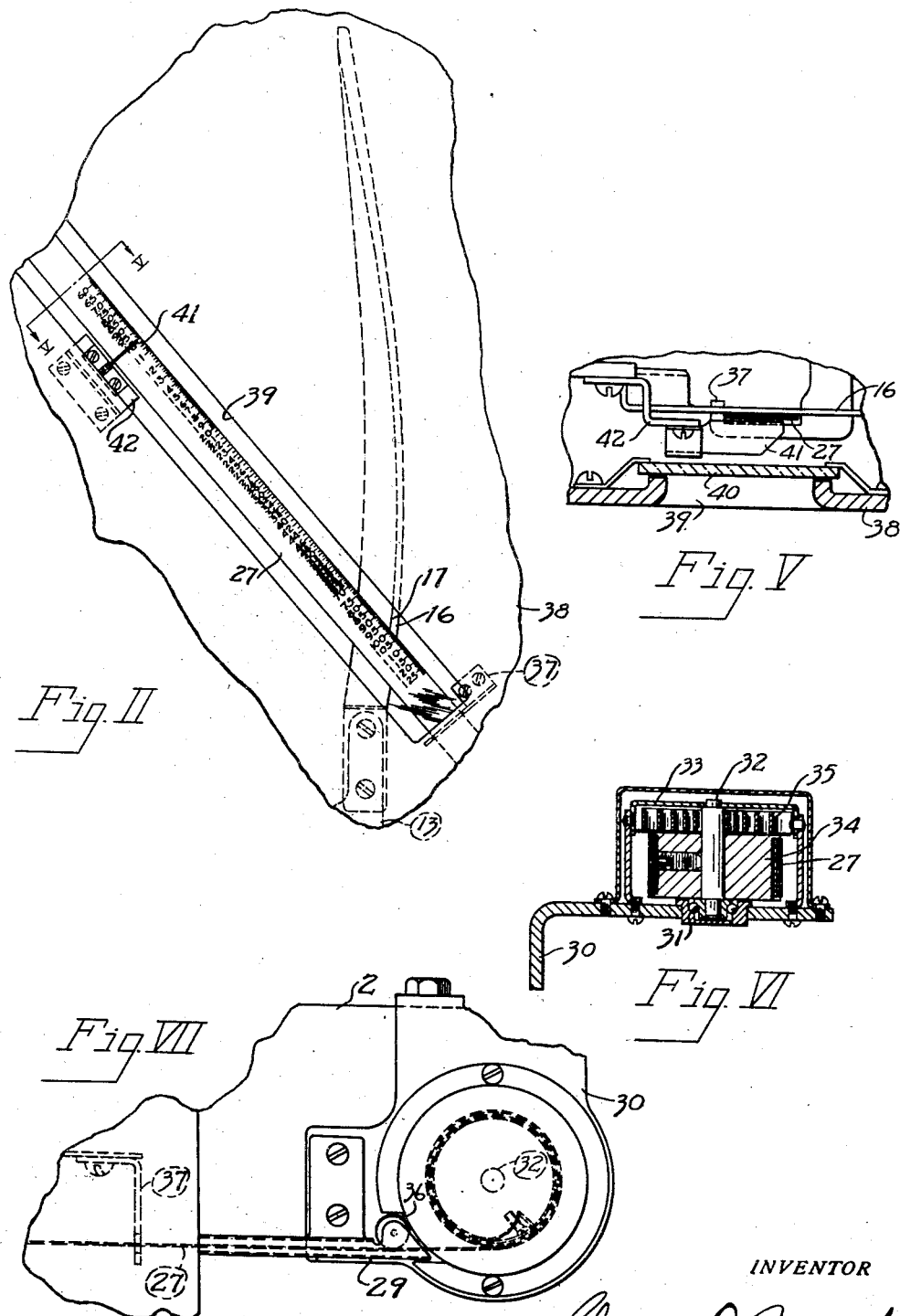

Patented Feb. 14, 1939

2,147,304

UNITED STATES PATENT OFFICE 2,147,304

COMPUTING DEVICE

Charles O. Marshall, Toledo, Ohio, assignor to Toledo Scale Manufacturing Company, Toledo, Ohio, a corporation of New Jersey Application October 16, 1936, Serial No. 105,979

5 Claims. (Cl. 265—36)

This invention relates to computing devices, and particularly to automatic force measuring devices, and its principal object is the provision of an automatic force measuring device having adjustable means marked with logarithmically arranged indicia, and having an index, consisting of a curve, so incorporated with the measuring mechanism as to move logarithmic distances along such indicia when the mechanism is moved proportionately to a weight or force or measuring movement acting on the mechanism.

Another object is the provision of adjustable means marked with logarithmically arranged indicia, the location of which is such that the indicia are easily readable.

Still another object is the incorporation of such a computing device in automatic weighing scales of known construction.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of an automatic weighing scale of the fan type embodying my invention;

Figure II is an enlarged fragmentary front elevational view showing a part of a logarithmically graduated member with a cooperating fixed pointer and movable indicator upon which is inscribed a modified logarithmic curve, the indicator being shown in one-half capacity position;

Figure III is an enlarged sectional plan view taken along the line III—III of Figure I, showing a manually operated reel for winding up the member bearing the logarithmically arranged graduations;

Figure IV is an enlarged front elevational view partly in section on the line IV—IV of Figure III, showing the manually operated reel;

Figure V is an enlarged sectional view taken along the line V—V of Figure II, showing the relative position of the fixed pointer, the logarithmically graduated member and the indicator.

Figure VI is an enlarged front elevational view in section taken along the line VI—VI of Figure I, showing a spring operated reel for winding up the logarithmically graduated member; and Figure VII is an enlarged fragmentary plan view taken along the line VII—VII of Figure I, showing the locations of a protector tube and roller guides for the member bearing the logarithmic graduations.

Referring to the drawings in detail, the weighing scale illustrated has a base 1, upon which is mounted an upright housing 2. A fulcrum stand 3 is fastened to the base 1 and contains bearings 4 which support fulcrum pivots 5 fixed to a lever 6. A platform spider 7 is supported upon the lever 6 by means of bearings 8 and load pivots 9, and carries a load-receiving platform 10, the condition of level of the platform spider 7 being maintained by means of a stem 11, which extends downwardly to a check link 12.

The lever 6 extends into the housing 2 through an opening and is connected to a load-counterbalancing pendulum 13 by means of a link 14. Also connected to the lever 6, and secured to the base 1, is a vibration damping dashpot 15.

Fastened to an extending portion of the pendulum mechanism 13 is a hand 16, adapted to move angularly within the housing 2, the arrangement being such that when a load is placed upon the platform 10 the mechanism moves to a position in which the load is counterbalanced and the hand 16 moves through an angle dependent upon the weight of the load.

In the device of my invention a modified logarithmic curve 17 is inscribed upon the surface of the hand 16 in the manner shown in Fig. II, the successive locations of points on the curve being such that when the hand swings under the influence of loads on the platform 10 the intersection of the curve with a straight line in a certain location will move along the straight line for distances proportional to the logarithms of the weights of the loads.

To locate the straight line and curve in the proper cooperative relation, the following method may be employed: First lay out a chart having an arcuate line along which is a row of graduations spaced into 100 intervals corresponding to the angles traversed by the indicator hand 16 of the scale under the influence of 100 equal increments of load the total weight of which is equal to the weighing capacity of the scale. Next pivot a flat strip of Bristol board or other smooth, stiff material at the center of curvature of the arcuate row of graduations, then cut the strip off at the arcuate line, place a radial mark at its end midway between its sides and swing the strip about its pivot until the mark at its end is in registration with the hundredth graduation on the arcuate line of the chart, i. e., the graduation corresponding to the position assumed by the hand 16 with a capacity load on the scale. Inscribe a series of marks located along a straightedge according to the logarithms of an arithmetical series of numbers ranging from 1 to 100, the length of the series of marks being somewhat less than, for example about five-sixths of, the length of the radius of the arcuate line on the chart. Lay the straightedge upon the chart and pivoted strip with the mark on the straightedge corresponding to log 1 in registration with a graduation on the chart indicative of 1/100 of the chart capacity and the mark on the straightedge corresponding to log 100 near the right edge of the strip.

With the chart, strip and straightedge arranged as set forth above, place a dot on the strip at the straightedge graduation corresponding to log 100, then without moving the straightedge and chart, move the strip under the straightedge about its pivot until the mark at its end registers with the graduation on the chart corresponding to 99/100 of capacity and place a dot on the strip at the mark on the straightedge corresponding to log 99. Move the strip about its pivot to bring the mark at the end of the strip successively into registration with the graduations along the arcuate line, and place dots on the strip at the marks on the straightedge corresponding to the logs of the numerators of the fractional chart capacities represented by the graduations in registration with the mark at the end of the strip until the strip has thus been moved from end to end of the arcuate line. The series of dots thus located on the pivoted strip will lie along a curve which, if the straightedge has been advantageously located, will resemble the curve 17 shown in Figure II.

If the curve through the dot lines on the strip should have a hook at its end or otherwise depart from the form of curve illustrated in Figure II, the lower end of the straightedge should be shifted slightly and a new series of dots marked on the indicator hand. The straightedge, of course, may be repositioned until a satisfactorily advantageous position is found. The more nearly the curve through the series of dots on the strip approaches a straight line the better, since the curve is to be transferred to the light, narrow, but stiff indicator hand 16.

Supported on the upper part of the housing 2 is a bracket 18 having an opening through which extends the lower end of a stem 19 that is equipped with a knob 20, the upper end of the stem extending through a frame 21 and having fixed thereon a collar 22 which carries an upright pin 23 adapted to engage notches in a Geneva stop disk 24 which is mounted for partial rotation on a stud 25 fixed to the frame 21. Since the Geneva stop disk 24 is incapable of a complete revolution it permits a limited number of turns of the stem 19, in the form illustrated the number of turns of the stem permitted being eight in either direction. Fixed upon the stem 19 is a reel 26 upon which is wound one end of a flexible metallic ribbon 27, and a four-pronged spring 28 pressed against the upper side of the reel 26 serves to frictionally hold the reel in any position to which it is turned by the knob 20. This flexible metallic ribbon passes through protector tubes 29, through the housing 2 and extends in front of the indicator 16, in close proximity to but out of actual contact with the surface of the indicator. The flexible metallic ribbon 27 is placed in such definite location that intersection of the line 17 and the edge of the ribbon will move distances along the edge of the ribbon proportional to the logarithms of weights on the platform 10. Changes in the location of the ribbon 27 require modifications in the curve 17. The arrangement shown in Figures I and II permits the curve to be inscribed on a narrow, light, nearly straight hand.

Fixed to the lower part of the housing 2 is a bracket 30 having an opening within which is journaled, by means of a ball bearing 31, the lower end of an upright shaft 32, the upper end of the shaft being journaled in a frame 33 which is secured to the bracket 30. A reel 34 is fixed to and carried by the shaft 32 and the shaft and reel are urged in one direction of rotation by a spiral spring 35, one end of which is attached to the shaft 32, the other end being fixed to the frame 33. Wound upon the reel 34 is the other end of the flexible metallic ribbon 27, the unwound portion being held taut between the two reels 26 and 34 by the cooperation of the spiral spring 35 and the four-pronged friction spring 28.

Rollers 36 fastened to the brackets 18 and 30, and guides 37 secured interiorly the housing 2 are provided so that the flexible metallic ribbon 27 will always travel in a straight line and in the same plane.

Secured to the front part of the housing 2 is a plate 38 in which is formed an angular slot 39 provided with a viewing window 40.

The flexible metallic ribbon 27 is marked along its upper edge with graduations designated by numbers ranging from a fraction of unity to some high number such, for example, as 10,000, the graduations being spaced logarithmically to cooperate with the curved line 17 inscribed on the hand 16. The graduations on the flexible metallic ribbon are located according to the same system as that employed in locating the marks on the straightedge used in determining the curve to be inscribed on the indicator hand, and the ribbon is located in the same position relative to the curve as that in which the straightedge was located when the curve was generated. While the graduations are spaced logarithmically, they are numbered with the antilogarithms of their respective positions. I shall term this arrangement of the graduations and numbers a logarithmic arrangement.

When a load is placed upon the platform 10, the hand 16 will travel to a position corresponding to the weight of the load and the curve 17 will intersect the upper edge of the flexible metallic ribbon 27 at a point corresponding in position to the logarithm of the weight of the load. If, for example, 10 lbs. be placed upon the platform, the curve 17 will assume the position in which it is shown in Figure II. By turning the knob 20, the ribbon 27 may be shifted until the point of intersection is at the graduation numbered 10. When the ribbon 27 is in this position a load of 1 lb. on the platform 10 will cause the curve 17 to intersect the upper edge of the ribbon 27 at the graduation numbered 1; a load of 1½ lbs. will cause the curve to intersect the upper edge of the ribbon at the graduation numbered 1½; a load of 2 lbs. will cause the curve to intersect the edge at the graduation numbered 2; 3 lbs. will cause the curve to intersect the edge at the graduation numbered 3, etc. Thus, when the ribbon is in this position, the weights of loads on the platform will be indicated automatically and directly in pounds and fractions thereof. As a guide by which the ribbon may be accurately reset at any time, a fixed pointer 41 is mounted, by means of a bracket 42, within the housing 2 and located at the point where the curve 17 intersects the upper edge of the ribbon 27 when a load of 1 lb. is placed upon the platform 10.

If it is desired to weigh in libras, a 1-libra weight may be placed upon the platform 10 and the ribbon 27 shifted, by turning the knob 20, until the graduation numbered 1 is brought to the place at which the curve 17 intersects the upper edge of the ribbon 27 with the 1-libra weight on the platform. With the ribbon 27 in such position, the weight of any commodity placed upon the platform will be automatically and directly indicated in libras. By placing a 1000-gram weight on the platform 10 and shifting the ribbon until the graduation numbered 1000 is at the point of intersection between the curve 17 and the upper edge of the ribbon 27, the scale may be adjusted to indicate weight automatically and directly in grams. Similarly it may be adjusted to weigh in mommes, okas and other units of weight.

For the purpose of counterbalancing the weights of containers, the scale is equipped with a tare poise 43. With the weight of a container counterbalanced by the tare poise 43, a pint of liquid may be placed in the container, the ribbon shifted so that the graduation numbered 1 is at the point of intersection of the curve 17 and the upper edge of the ribbon 27, and the scale thus adjusted to indicate in pints. Similarly it may be set to indicate in other units of volume.

The form of scale illustrated is well adapted for use in determining the yardage of bolts of cloth. In using the scale for this purpose, the tare poise 43 is first set to counterbalance the weight of the board upon which the cloth is wrapped, if there be such a board. The ribbon is then shifted until the graduation numbered with the number of yards per pound of the goods is in registration with the pointer 41. With the bolt of goods on the platform 10, the curve 17 will intersect the upper edge of the ribbon 22 at the place where the graduations on the ribbon correspond to the number of yards in the bolt of cloth. The scale may be used likewise to indicate other dimensional units, such as linear inches, square feet, or cubic centimeters.

The specific gravity of a liquid may be determined by first placing a container of water and a container of the liquid to be tested on the platform 10 and counterbalancing the containers and liquids by means of the tare poise 43, then suspending a solid in the water and shifting the ribbon until the graduation numbered 1 is at the point of intersection of the curve 17 with the upper edge of the ribbon 27, and finally suspending the same solid in the liquid to be tested, whereupon the specific gravity of the liquid to be tested will be indicated by the marking on the ribbon 27 at the place where it is intersected by the curve 17.

To determine the specific gravity of a solid object heavier than water, place a vessel of water on the platform 10 and counterbalance it by means of the tare poise 43; then suspend the object in the water by a thread or the like and shift the ribbon until the graduation numbered 1 is at the point where the curve 17 intersects the upper part of the ribbon 27, then lower the object until the object rests upon the bottom of the vessel, whereupon the curve 17 will move to intersect the upper edge of the ribbon 27 at the place where the markings on the ribbon correspond to the specific gravity of the object.

If it is desired to count identical pieces such as screws or bearing balls, a number of pieces sufficient to allow the upper part of the curve 17 to rise above the upper edge of the ribbon 27 is placed upon the platform 10. If, for example, 12 pieces are placed upon the platform to bring the curve 17 into proper preliminary position, the ribbon 27 is shifted to bring the graduation numbered 12 to the point of intersection of the curve with the upper edge of the ribbon. If then the remainder of the lot be placed upon the platform, the number of piece will be automatically and directly indicated by the markings on the ribbon 27 at the place where its upper edge is intersected by the curve 17.

By placing an article or substance which is to be processed upon the scale platform and shifting the ribbon 27 until the graduation numbered 100 is at the point of intersection of the curve 17 with the upper edge of the ribbon and subsequently placing the article or substance, after processing, upon the scale platform with the ribbon in the same position, the weight after processing, in terms of percentage of the original weight, may be read upon the ribbon at the point of intersection of the curve 17 with its upper edge. If it is desired to divide a quantity of material into, say, 37 equal portions, the material may be placed upon the scale platform and the ribbon 27 shifted until the graduation numbered 37 is at the point where the upper edge of the ribbon is intersected by the curve 17. With the ribbon in this position, portions may be removed to bring the point of intersection successively to the graduations numbered 36, 35, 34, etc. The material may thus be allocated without deficiency or residue.

Numerous other determinations of values, one factor of which is weight or is measurable by force or movement, may be easily and quickly made, as the ribbon may be shifted to a position corresponding to any selected datum. In general, the device will automatically indicate any value which can be found by first making a weighment or like measurement and then making a slide rule computation in which the result of the weighment or measurement is used as a factor.

In the form of ribbon illustrated in Figure II the graduations beginning at 10 and continuing below unity are distributed according to their decimal values, but these graduations may be distributed fractionally—viz. by halves, quarters, eighths, etc.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, automatic load-counterbalancing mechanism, an angularly movable member, a member marked with a row of logarithmically arranged indicia and extending non-radially with respect to the axis of movement of said angularly movable member, said angularly movable member carrying a modified logarithmic curve on its surface and being connected to said automatic load-counterbalancing mechanism to be moved therewith, a portion of said curve lying adjacent said indicia, said curve being moved logarithmically along said indicia by angular movement of said angularly movable member, and means for shifting the member marked with said indicia across the direction of movement of the adjacent portion of the surface of said angularly movable member to positions corresponding to selected data.

2. In a device of the class described, in combination, automatic load-counterbalancing mechanism, an angularly movable member, a flexible strip marked with a row of logarithmically arranged indicia and extending non-radially with respect to the axis of movement of said angularly movable member, said angularly movable member carrying a modified logarithmic curve on its surface and being connected to said automatic load-counterbalancing mechanism to be moved therewith, a portion of said surface carrying said curve lying closely behind said strip, the intersection of said curve and an edge of said strip being logarithmically movable along the edge of said strip by such movement of said angularly movable member, and means for shifting said strip longitudinally to positions corresponding to selected data.

3. In a device of the class described, in combination, automatic load-counterbalancing mechanism, an angularly movable member, a flexible strip marked with a row of logarithmically arranged indicia and extending non-radially with respect to the axis of movement of said angularly movable member, said angularly movable member carrying a modified logarithmic curve on its surface and being connected to said automatic load-counterbalancing mechanism to be moved therewith, a portion of said surface carrying said curve lying closely behind said strip, the intersection of said curve and an edge of said strip being logarithmically movable along the edge of said strip by such movement of said angularly movable member, means for shifting said strip longitudinally to positions corresponding to selected data, and a pointer pointing to graduations on said strip to indicate its selected position.

4. In a device of the class described, in combination, a narrow angularly-movable hand, a modified logarithmic curve inscribed on said hand and extending longitudinally thereof, a member marked with a row of logarithmically arranged indicia and extending non-radially with respect to the axis of movement of said hand, said row of indicia lying across said curve, said curve being moved logarithmically along said indicia by angular movement of said hand, and means for shifting the member marked with said indicia across the direction of movement of the adjacent portion of said curve to positions corresponding to selected data.

5. In a device of the class described, in combination, automatic load-counterbalancing mechanism comprising a swinging pendulum, a narrow elongated hand fixed to said pendulum, a modified logarithmic curve extending longitudinally of said hand, a flexible strip marked with a row of logarithmically arranged indicia lying across said hand and extending non-radially with respect to the axis of movement of said hand, the intersection of said curve and the edge of said strip being movable along said strip distances proportional to the logarithm of the load-counterbalancing effect of said load-counterbalancing mechanism, and means for shifting said strip longitudinally to positions corresponding to selected data.

CHARLES O. MARSHALL.